Jan. 11, 1949.  G. W. WILLARD  2,458,665
METHOD OF AND APPARATUS FOR MEASURING PRESSURE
Filed March 24, 1944  7 Sheets-Sheet 1

INVENTOR
G. W. WILLARD
BY
E. V. Griggs
ATTORNEY

Jan. 11, 1949. G. W. WILLARD 2,458,665
METHOD OF AND APPARATUS FOR MEASURING PRESSURE
Filed March 24, 1944 7 Sheets-Sheet 2

INVENTOR
G. W. WILLARD
BY
ATTORNEY

Jan. 11, 1949. G. W. WILLARD 2,458,665
METHOD OF AND APPARATUS FOR MEASURING PRESSURE
Filed March 24, 1944 7 Sheets-Sheet 3

FIG. 4

INVENTOR
G. W. WILLARD
BY
E. V. Griggs
ATTORNEY

Jan. 11, 1949.  G. W. WILLARD  2,458,665
METHOD OF AND APPARATUS FOR MEASURING PRESSURE
Filed March 24, 1944  7 Sheets-Sheet 4

INVENTOR
G. W. WILLARD
BY
ATTORNEY

Jan. 11, 1949.　　　　G. W. WILLARD　　　　2,458,665
METHOD OF AND APPARATUS FOR MEASURING PRESSURE
Filed March 24, 1944　　　　　　　　　　7 Sheets-Sheet 6

INVENTOR
G. W. WILLARD
BY
E. V. Griggs
ATTORNEY

Jan. 11, 1949.   G. W. WILLARD   2,458,665
METHOD OF AND APPARATUS FOR MEASURING PRESSURE
Filed March 24, 1944   7 Sheets-Sheet 7

INVENTOR
G. W. WILLARD
BY
E. V. Griggs
ATTORNEY

Patented Jan. 11, 1949

2,458,665

UNITED STATES PATENT OFFICE 2,458,665

METHOD OF AND APPARATUS FOR MEASURING PRESSURE

Gerald W. Willard, Fanwood, N. J., assignor to Bell Telephone Laboratories, Incorporated, New York, N. Y., a corporation of New York Application March 24, 1944, Serial No. 528,013

6 Claims. (Cl. 175—183)

This invention relates to a method of and apparatus for measuring pressure and more particularly to a method of and apparatus for measuring pressure within hermetically sealed devices.

An object of the invention is to facilitate the measurement of pressures within closed containers.

A more specific object of the invention is to facilitate the measurement of pressures which are lower than atmospheric pressure but not lower than a pressure of one-half inch of mercury.

Another specific object of the invention is to facilitate testing hermetically sealed devices for leakage.

Quartz piezoelectric plates, when designed for use in apparatus which is likely to be subjected to rapidly changing atmospheric conditions such, for example, as radio apparatus for aircraft, are commonly hermetically sealed, at atmospheric pressure, within a suitable container which may comprise a box and cover of suitable insulating material, such as Bakelite, together with a gasket and screws for clamping the cover in closed and sealed position after the plate has been mounted in the holder. Suitable terminal pins may be mounted on the outside of the box to permit making electrical connections to the electrodes of the crystal plates mounted within the holder. In order to facilitate the use of piezoelectric crystal plates in electrical circuits it is usual to provide electrodes cooperating with one or more of the surfaces of the plate to which the external circuit conductors may be electrically connected in a suitable manner. These electrodes may comprise, for example, a relatively thin coating of suitable metal such as gold or silver applied, for example, by the process of thermal evaporation directly to the surfaces of the plate. Again they may take the form of suitably shaped, separate metal plates held in contact with portions of the surfaces of the plate by suitable means such as spring elements. One purpose of so mounting the plates is to prevent the possible condensation of moisture on the surfaces thereof due to rapidly fluctuating external atmospheric conditions (pressure, temperature, humidity) such as are likely to be encountered during the flight of the plane. The operation of the plate would be seriously interfered with if droplets of moisture were to form on the surfaces of the plate due to such condensation.

During manufacture of the hermetically sealed crystal units, it is necessary of course to test the completed, sealed unit in order to determine the effectiveness of the seal; the method and apparatus of the present invention are particularly applicable in connection with the testing of such units and the invention will be described as so applied. It will be understood of course that the invention is not limited in its application to this particular use.

It has previously been proposed to test the effectiveness of the seal of a hermetically sealed container in several different ways all of which involved immersing the container to be tested in water. For example, one such testing procedure involved immersing the container in a water tank which could be closed by a glass cover and evacuated. The operator then lowered the pressure within the tank and watched the container for bubbles, the appearance of which, of course, would indicate the leakage of air from the container.

All of the so-called water tests have been found to be unsatisfactory for one reason or another and a particularly valuable feature of the present invention resides in the fact that the novel testing procedure does not involve immersion of the container being tested in water or other liquid.

Another feature of the present invention resides in the fact that certain factors, particularly the time of maintaining a reduced pressure before observing for current flow, may be varied at will thereby testing for leakages of almost any predetermined magnitude.

The novel arrangement of the present invention is based upon applicant's discovery that the gas pressure around two opposed or separated electrodes, i. e., electrical conductive members or elements, may be determined by measuring current flow, at constant voltage above the minimum sparking voltage, between the two electrodes, i. e., the method depends upon the variation in magnitude of an ionization current between a pair of electrodes (for a given voltage) with changes in the pressure of the gas surrounding the electrodes. So far as the range of pressures in which the arrangement is designed to function is concerned, the ionic current increases as the pressure of the gas decreases. In the instance of a container that has been closed and sealed at atmospheric pressure, for example, and is subsequently surrounded by a pressure lower than that at which it was sealed, there will be no lowering of pressure within the holder if the seal is effective to produce a true hermetic sealing of the container.

However, if a true hermetic seal has not been achieved the air or other fluid imprisoned within the container will escape to the more rarified surrounding area and the pressure within the container will be lowered correspondingly, the rate of escape being determined by the condition of the seal. Effectiveness of the seal may be determined therefore by observing whether a decrease in the pressure within the container occurs when the container is subjected to a lower ambient pressure than that at which it was sealed, i. e., atmospheric pressure, and, if such change does occur, by observing the magnitude thereof.

In accordance with a specific embodiment of the invention, test equipment designed to test a plurality of hermetically sealed quartz plate holders comprises a cabinet on which is mounted an evacuation or vacuum chamber. A vacuum pump for evacuating the chamber to the desired level, a pressure regulator, pressure gauges, voltage supply means, current meter and other incidental items of equipment are provided certain of which may be mounted on or within the cabinet. A socket plate is mounted in the lower portion of the evacuation chamber for removably supporting the sealed crystal holders which are to be tested. In use the holders to be tested are mounted on the socket plate within the evacuation chamber, the cover thereof is closed and sealed thereby completing a gas tight enclosure around the holders and the pressure within the chamber is lowered to the particular level predetermined in accordance with the requirements of the test. After maintaining this level for a predetermined time, a regulated, i. e., a current-limited voltage is applied across the terminals of each sealed holder in turn and the corresponding ionic current flow (if any) between the separated or opposed electrodes within the respective holder is measured. The intensity of the ionic current flow will be an indication of the pressure of the air or other fluid within the respective holder and it may be readily observed therefore how much, if any, the pressure within the holder has dropped due to leakage through the seal to the surrounding area of lowered pressure.

Magnitudes of pressure will be defined herein by the terminology commonly followed in the scientific and technical publications, i. e., the term "a pressure of eight inches of mercury," for example, means a pressure that will just support a column of mercury eight inches in height; "a pressure of one-half inch of mercury" means a pressure that will just support a column of mercury one-half inch in height and so on. Similarly the term "ambient pressure" is used in its commonly accepted sense to define the pressure immediately surrounding the object or area in question. The term "gas" is used in the usual scientific sense and is intended to include atmospheric air. While the term "hermetically sealed" is used at various points herein in reference to containers the seals of which are being tested to determine whether or not the seal is effective to meet specified requirements which in some instances may permit a slight leakage, it is of course understood that, in the exact sense, the term "hermetically sealed" should be applied only when the seal is perfect, that is, when it will entirely eliminate leakage between the interior of the container and the surrounding area.

Figure 1:
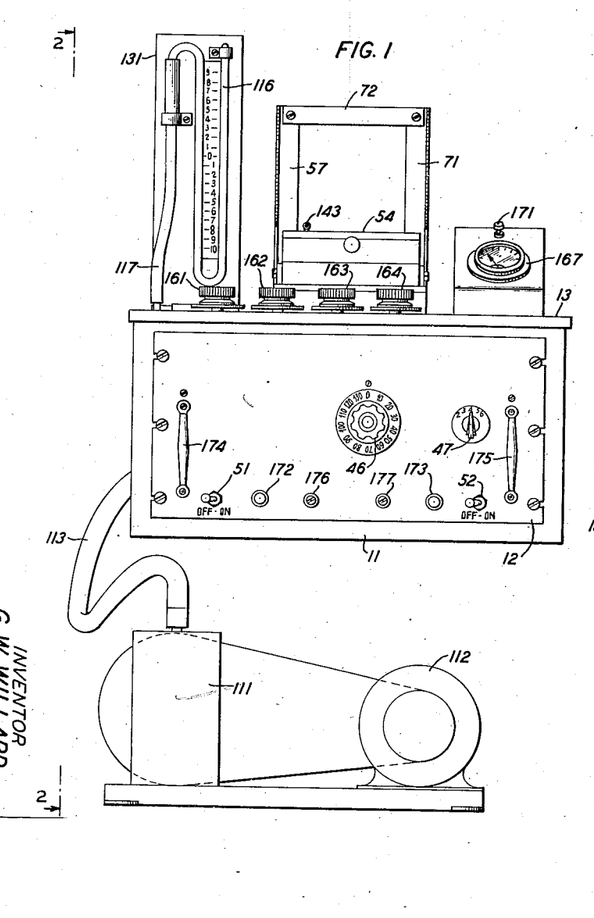
Fig. 1 is a front elevational view of an arrangement for testing hermetically sealed containers which embodies features contemplated by the present invention.

Referring now to the drawings, there is illustrated a testing device comprising a cabinet 11 which is provided with a removable front panel 12 and a removable top panel or cover plate 13. As shown particularly in Fig. 5, front panel 12 and the associated apparatus mounting base 14 may be removed as a unit from the cabinet. Plug-type connectors 15 and 16 within the cabinet 11 (see Fig. 4) engage with jack-type connectors 17 and 21 respectively (Fig. 5) when base 14 is in position within cabinet 11 thereby maintaining electrical continuity between equipment carried by the removable unit and equipment carried by the cabinet proper. Similarly, top panel 13, as indicated most clearly by Fig. 4, may be readily removed as a unit from the cabinet; plug assembly 18 and jack assembly 19 cooperate when panel 13 is in closed position on the cabinet to maintain electrical continuity between the respective equipment elements.

Figure 5:
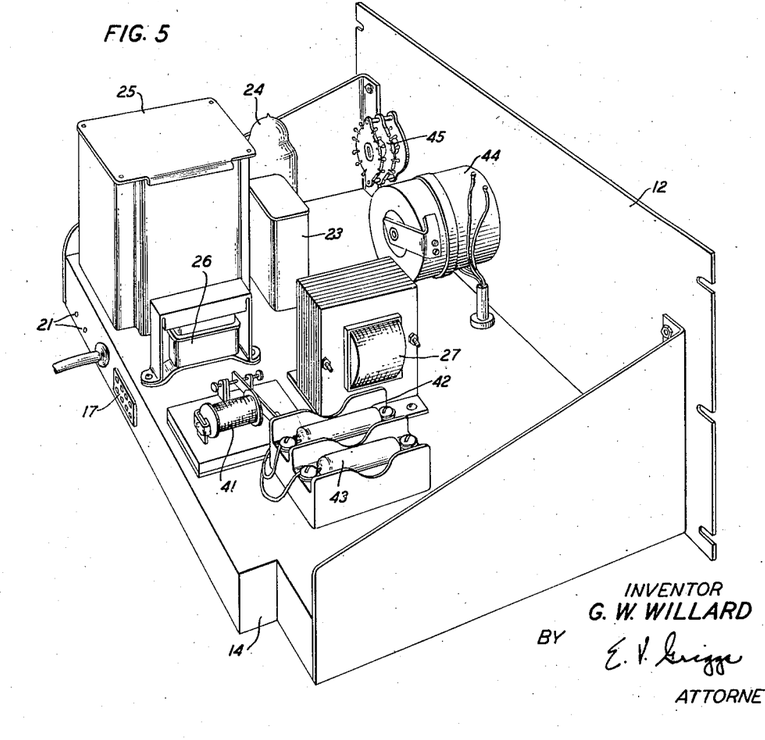
Fig. 5 is a perspective view of the front panel and associated mounting base.

As shown particularly in Fig. 5, several equipment units are mounted on base 14 and front panel 12. These units, the function of which will become apparent from subsequent consideration of the schematic circuit and other portions of the specification, include condenser 23, vacuum tube 24, transformers 25, 26 and 27, relay 41, fuses 42 and 43 with suitable fuse holders, voltage adjusting auto-transformer 44 and resistance element selecting switch 45. The resistance elements are preferably mounted directly on the two plates of switch 45, several of the elements being shown in the drawing. As shown in Fig. 1, dials 46 and 47 are provided for operation of voltage and resistance selectors 44 and 45 respectively. Off-on switches 51 and 52 are also mounted on panel 12.

Figure 2:
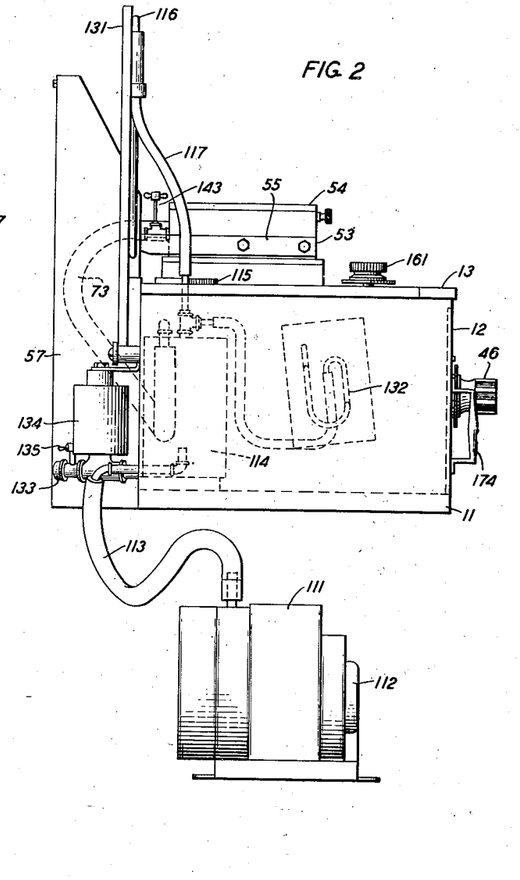
Fig. 2 is a side elevational view of the device illustrated in Fig. 1.
Figure 3:
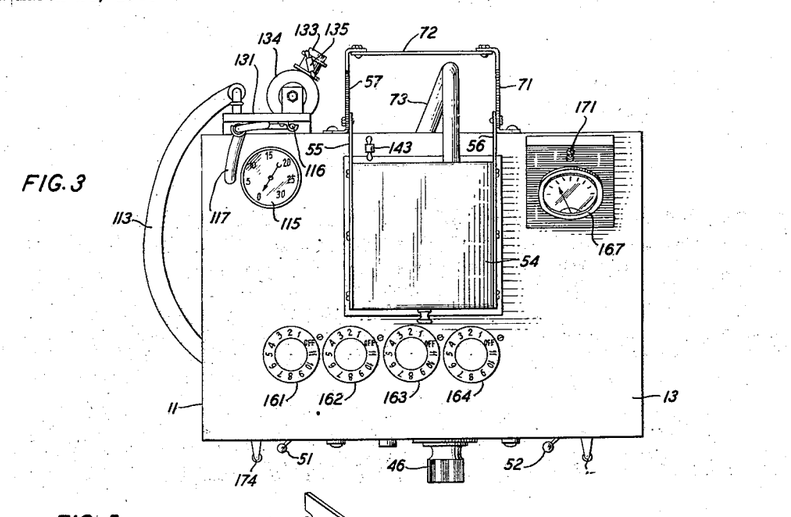
Fig. 3 is a plan view of the device illustrated in Fig. 1.
Figures 6, 8:
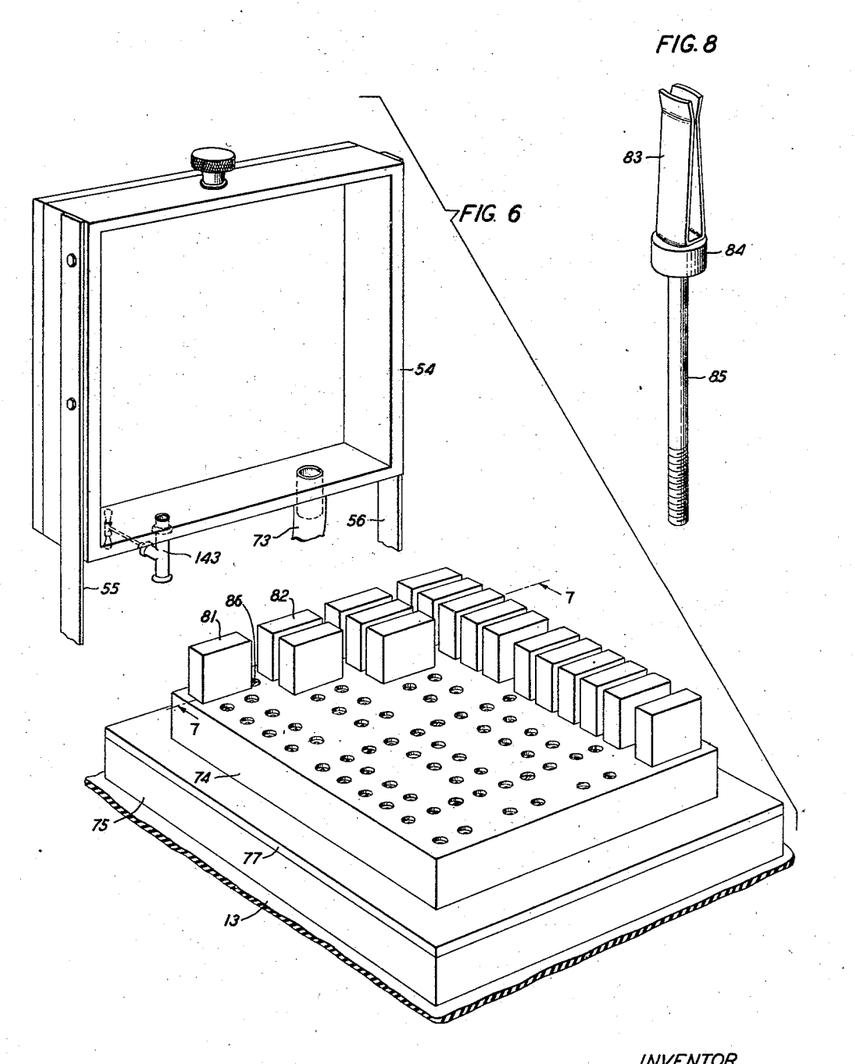
Fig. 6 is a view in perspective of the evacuation chamber with the cover in raised position to disclose a number of crystal plate holders mounted in position for testing.
Fig. 8 is a view in perspective of one of the spring jack terminals.

Evacuation or vacuum chamber 53 is mounted on top panel 13, being shown with cover 54 in closed position in Figs. 1, 2 and 3 (in which position a gas tight enclosure is formed) and with the cover in open position in Fig. 6. Cover 54 is supported, somewhat loosely, by hinge arms 55 and 56 which are rotatably attached by suitable bolts or other pivots to upright members 57 and 71 respectively. Members 57 and 71, together with top cross bar 72, act as a support for cover 54 when it is in raised or open position. As apparent from Figs. 2 and 3, members 57 and 71 extend down the rear of cabinet 11 to the base thereof and act also as a guard for exhaust tube 73.

Figure 7:
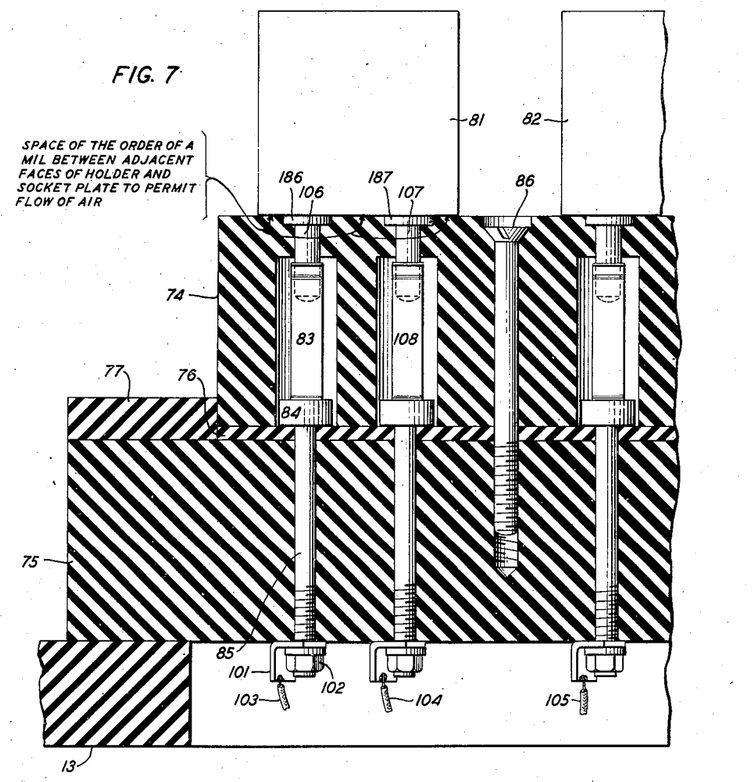
Fig. 7 is an enlarged sectional view of a portion of the socket plate taken on line 7–7 of Fig. 6, showing particularly the arrangement of the spring clip or jack terminals in the socket plate.

As shown clearly in Figs. 6 and 7, evacuation chamber 53 comprises, in addition to cover 54, socket plate 74 of suitable insulating material and base plate 75 also of suitable insulating material, gasket 76 being positioned between the two plates. A second gasket 77 is positioned on the exposed upper surface of plate 75 and serves to seal the chamber when cover 54 is in closed position.

As shown in Fig. 6, the socket plate is provided with a plurality of pairs of apertures, sockets or holes, the number of pairs of holes determining the number of sealed holders or containers that can be tested at one time. (The capacity of the set illustrated, therefore, is forty-four holders although the capacity may be made greater or less as desired.) The two holes of each pair are properly spaced to receive the two terminal pins of a respective one of the holders being tested. A number of hermetically sealed holders, as 81 and 82, is shown in position for testing in Fig. 6.

A spring clip or jack terminal assembly of the type shown in Fig. 8 is associated with each of the holes of the socket plate. Each terminal assembly comprises a socket or jack portion 83, a shoulder 84 and a threaded bolt portion or stud 85. As shown in Fig. 7 a soldering lug is positioned on each bolt portion of the terminal assemblies, being held in place by a nut. For example, soldering lug 101 is held on bolt 85 by nut 102. These soldering lugs facilitate the electrical connection of conductors (leading to apparatus to be described subsequently) to the respective bolts or studs and thence to the socket portions of the terminal assemblies. Conductors 103, 104 and 105 are shown in part in Fig. 7.

Figure 4:
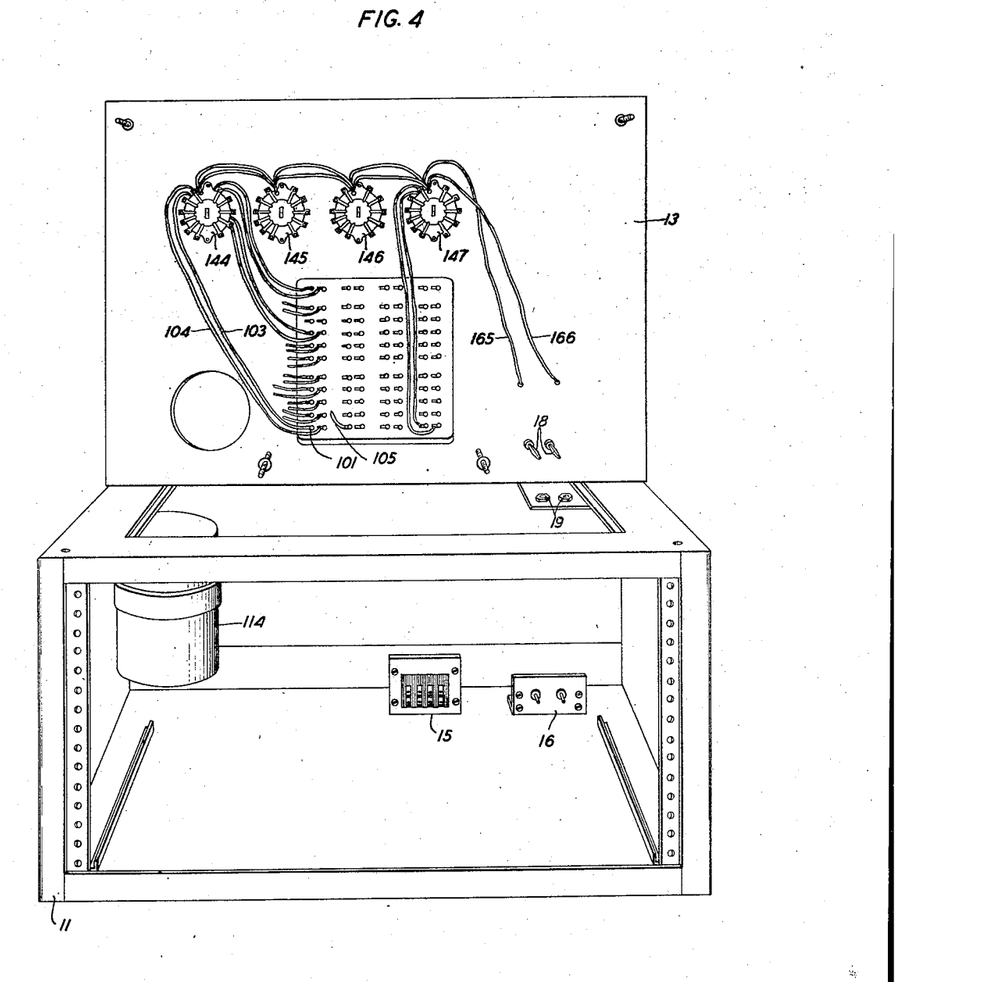
Fig. 4 is a perspective view of the cabinet of the arrangement of Fig. 1 with the front panel and associated apparatus mounting base removed and with the top panel in raised position to show the underneath side thereof.

It will be apparent from Figs. 7 and 4 that the spring contact or terminal assemblies act not only as electrical connecting members but also as mechanical elements for sealing the holes in base plate 75, the shoulder portions such as shoulder 84 being effective for this purpose. Socket plate 74 is held in its proper registering position on base plate 75 by a number of suitable screws, screw 86 being shown in Fig. 7. Socket plate 74 may be easily removed by removal of these screws without disturbing the seal effected between gasket 76 and base plate 75 by the shoulders (such as shoulder 84). The novel construction is such that the evacuation chamber proper is sealed by gasket 76 so that when cover 54 is in closed position and is sealed by gasket 77 and when the chamber is evacuated through exhaust tube 73, the "base" of the chamber so far as changes in atmospheric pressure are concerned comprise gaskets 76 and 77. The shouldered portion provided on the terminal assemblies, as shoulder 84, are effective in bringing this sealing action about.

The novel construction of the evacuation chamber is such that the socket plate may be easily removed for cleaning and the stud, or bolt, mounting may be easily replaced. Further the novel form of contact terminals utilized and the spacing thereof in the socket plate permit testing of holders having slightly different types of pin terminals. In the event that it be desired to test containers having a terminal arrangement substantially different than that of the holders illustrated, top panel 13, which carries socket plate 74 and associated wiring as well as the switches and meters referred to above, may be easily removed and replaced by another top panel provided with a socket plate arranged to accommodate the particular terminals involved. The provision of the jack and plug type connection (plugs 18 and jacks 19, Fig. 4) referred to above facilitates the removal of one top panel and replacement thereof by another (meter 167 and associated switch 171 are preferably jack mounted so they may be readily removed from one panel and replaced on another).

It will be evident that with holder 81 in position as indicated in Fig. 7, conductors 103 and 104 will be electrically connected through jack terminals 83 and 108, respectively, to terminal pins 106 and 107 respectively of the holder; terminal pins 106 and 107 in turn are electrically connected to the respective electrodes for the crystal plate mounted within the holder.

As mentioned above, evacuation chamber 53, when closed and sealed by cover 54, may be exhausted to the desired pressure level through exhaust tube 73. The apparatus utilized in bringing the pressure within the evacuation chamber to various desired levels (by a method which will be described in detail subsequently) includes a vacuum pump 111 driven by motor 112. Pump 111 is connected through tube 113 to oil trap 114, entering the latter through the base thereof. Exhaust tube 73 which, as stated above, is connected to the evacuation chamber 53, is also connected to oil trap 114 entering the latter through the top cover thereof.

Gage 115, which may be one of the ordinary types of steam vacuum gage and which is connected to oil trap 114 through a suitable tube or pipe leading through the top cover thereof, provides an immediate indication of evacuation when pump 111 is started and also gives a rough indication of the pressure within the system so long as the pressure is not too low (when barometric changes have a large effect on the reading of such a gage) say above a pressure of approximately ten inches of mercury. Such a gage of course reads pressure below atmospheric; rather than absolute pressure. For accurately measuring and indicating pressures below 10 inches of mercury, mercury manometer 116 is provided. Manometer 116 is connected to oil trap 114 by tube 117 which enters through the top cover thereof. Back plate 131, which is attached to the rear of cabinet 11, acts as a support for manometer 116 and its scale.

A pressure control auxiliary is provided for the purpose of keeping the absolute pressure in the evacuation chamber from going below a predetermined value, for example, below a pressure in the neighborhood of one-half inch of mercury. (The purpose of such a control will be brought out subsequently.) This control auxiliary includes closed mercury manometer switch 132

(Fig. 13) which is controlled by absolute pressure and which operates through holding relay 41 (Figs. 5 and 11), solenoid-operated valve 134 which in turn controls the admission of air through inlet pipe 133. Inlet pipe 133 enters oiltrap 114 through the bottom thereof. An adjustable needle valve 135 (Figs. 3 and 11) is associated with solenoid valve 134.

Figure 11:
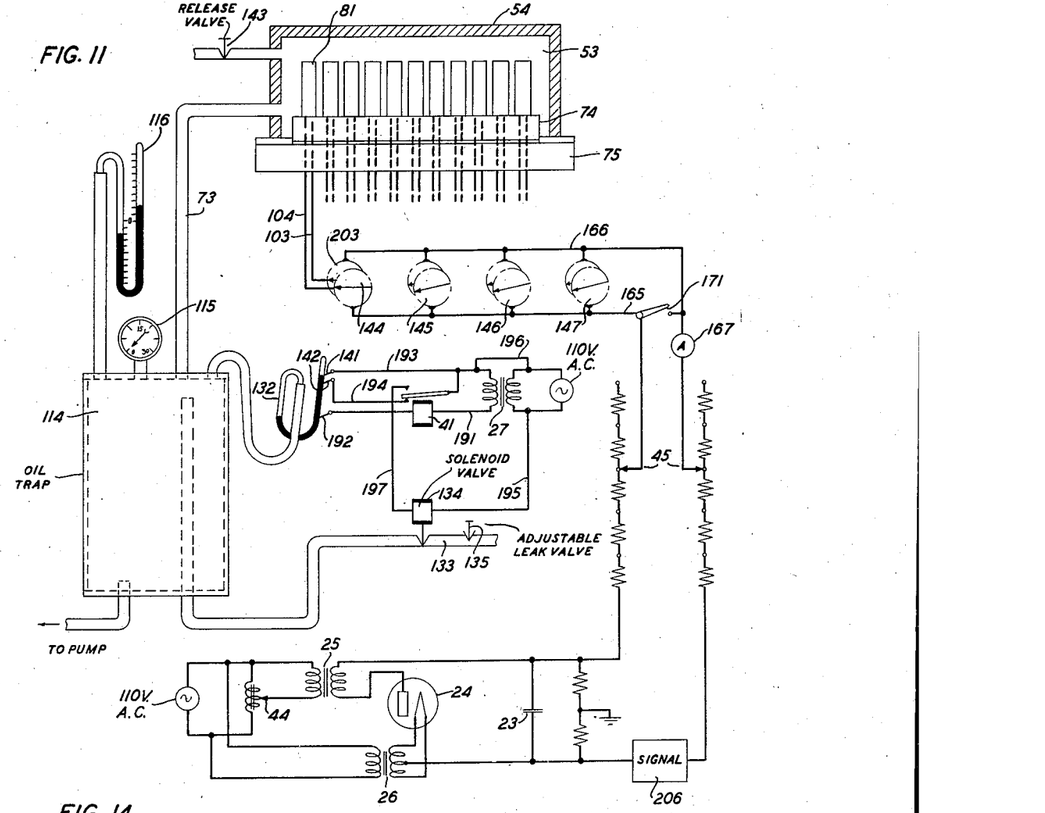
Fig. 11 is a schematic showing of the electric circuit utilized by the testing arrangement contemplated by the present invention.
Figure 13:
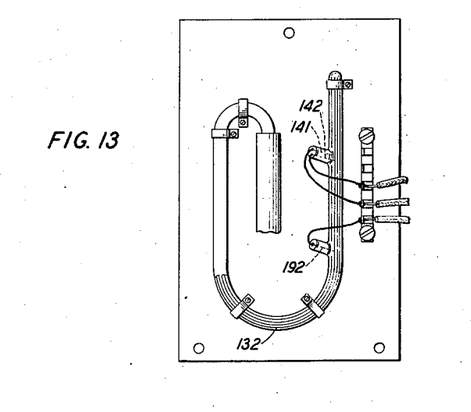
Fig. 13 is a view of the mercury manometer switch.

As indicated most clearly in Figs. 13 and 11, manometer switch 132 may be adjusted to approximately maintain any desired pressure within a certain range by adjusting its tilt.

When the pressure within evacuation chamber 53 falls below the predetermined minimum value, for example one-half inch of mercury, valve 134 opens and allows air to leak into the system through inlet tube 133 at a rate which is controlled by adjustable valve 135 and which is slightly faster than the pumping rate, until the pressure rises to a predetermined maximum value, for example five-eighths of an inch of mercury, at which point valve 134 closes and the cycle is repeated.

Release valve 143 is mounted on the rear of evacuation chamber 53; this valve may be opened upon completion of a test to permit air to enter evacuation chamber 53 in order to bring the interior thereof back to atmospheric pressure, before opening the cover.

Four double-tier selector switches are mounted on top panel 13, the lower switch in each respective pair being shown in Fig. 4. The switches shown are designated respectively 144, 145, 146 and 147. A knob is provided for rotating each pair of switches, these knobs designated 161, 162, 163 and 164 being shown in Figs. 1 and 3. As shown most clearly in Fig. 11 and as indicated in Fig. 4, each of the switches of one set has one terminal connected to one common conductor of the testing circuit while each of the switches of the other set has one terminal connected to a second common conductor of the circuit. Thus switches 144, 145, 146 and 147 of the "lower" set each have a terminal connected to conductor 165 while the switches of the "upper" set each have a terminal connected to conductor 166. Corresponding individual switching terminals of the switches are connected to the respective pairs of spring clip or jack terminals as indicated in Fig. 4.

In the embodiment of the invention selected for disclosure wherein the socket plate is designed to mount forty-four holders arranged in four rows of eleven holders each, each set of selector switches is arranged for control of one of the four rows and each switch is provided with twelve terminals, one terminal in each case corresponding to the "off" position of the respective switch, the other eleven corresponding to the eleven holders to be tested.

Microammeter 167 together with switch 171 for shorting the circuit beyond the meter (i. e., for shorting leads 165 and 166, Figs. 4 and 11) are mounted on top of panel 13. Lamp indicators 172 and 173 are mounted on front panel 12 and are associated respectively with switches 51 and 52. Hand grips 174 and 175 are also mounted on the front panel to facilitate removal and replacement of the same. Fuses 176 and 177 may be replaced from the front of the panel (Fig. 1).

Figure 9:
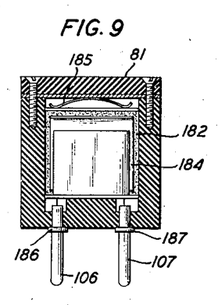
Fig. 9 is a sectional view of a sealed crystal plate holder of a type that may be tested by the arrangement of the present invention, a piezoelectric crystal plate being shown mounted within the holder.
Figure 10:
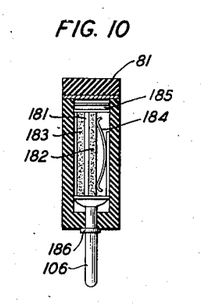
Fig. 10 is an end sectional view of the holder of Fig. 9.

For purpose of further describing the arrangement and operation of the invention, it will be assumed that a number of hermetically sealed crystal plate holders of the general type illustrated in Figs. 9 and 10 are to be tested. The holder selected for illustration is of the so-called "pressure" type, i. e., piezoelectric plate 181 is positioned between electrodes 182 and 183, which are in the form of metal plates, and firm contact between the piezoelectric plate and the electrodes is assured by spring 184 while a second spring 185 aids in maintaining the assembly in proper position within the holder. Terminal pins 106 and 107 are connected to the respective electrode plates by suitable means. Shoulder portions 186 and 187 are provided on respective pins 106 and 107. The holders are placed in position on socket plate 74, as shown in Fig. 6, the respective terminal pins of the holders being positioned in the proper apertures in the socket plate. (Forty-four holders may be mounted in the socket plate illustrated but it will be understood that socket plates with greater or less capacity may be utilized, as desired.)

After the holders to be tested are placed in position, cover 54 is closed against gasket 77 to seal evacuation chamber 53, release valve 143 is closed and evacuation pump 111 is started. The holders should be carefully seated in position so that no appreciable gap will be allowed between the base of each holder and the adjacent top face of the socket plate. It will be obvious, however, that there will be air leakage between the upper surface of the socket plate and the adjacent surface of the holders; in other words, the "base" of the evacuation chamber proper is defined by gasket 76 and the shoulders of the jack terminals (as shoulder 84, Fig. 7) and not by the upper surface of socket plate 74 and the engaging surfaces of the holders.

As soon as pump 111 is started, gage 115 should indicate (by an increasing vacuum reading) a lowering pressure, assuming that a good seal has been attained between cover 54 and gasket 76. If gage 115 indicates that the apparatus is operating satisfactorily, the exhausting process continues until mercury manometer 116 indicates an absolute pressure in evacuation chamber 53 of about one-half inch of mercury.

As the pressure in the evacuation system is lowered, the mercury in manometer switch 132 will "fall"; i. e., the level in the right half of the U tube will drop and the level in the left half of the tube will rise, Fig. 11. So long as the level in the right half of the tube is sufficiently high to engage either terminals 141 or 142, relay 41 will be held operated by current supplied from the secondary winding of transformer 27, over conductor 191, operating winding of relay 41, terminal 192 and back to the other side of the secondary winding of transformer 27 over either of two paths depending upon the mercury level, i. e., either from terminal 141 over conductor 193 and from terminal 142 over conductor 194 and make contact of relay 41 in parallel if the mercury be high enough to contact terminal 141 or from terminal 142 over conductor 194 and make contact of relay 41 alone if the mercury be in contact with terminal 142 but out of contact with terminal 141. However, as soon as the level of the mercury in switch 132 drops below terminal 142, the operating circuit of relay 41 will be broken and the relay will release.

As soon as relay 41 releases, solenoid-operated valve 134 will be operated over a path which includes conductors 195 and 196, break contact of relay 41 and conductor 197. Operation of valve 134 allows entry of air into the evacuation system through inlet pipe 133 thereby raising the pressure within evacuation chamber 53. The rate of entry of the air is governed by the position of adjustable leak valve 135. As the pressure in the system is now raised due to admission of air through inlet pipe 133, the mercury will rise in the right-hand half of the U-tube of switch 132 until contact is made with upper terminal 141 whereupon relay 41 is operated and valve 134 moves back to closed position, closing inlet pipe 133. This cycle is repeated continuously.

It will be noticed that, while the operating circuit of relay 41 is not completed until the mercury reaches upper terminal 141, i. e., it is not completed when the mercury reaches the lower terminal 142, the relay, once operated, will be held operated until the mercury drops below the lower terminal 142. The pressure is thereby automatically fluctuated in the range between a selected maximum pressure, which may be, for example, five-eighths of an inch of mercury, and a selected minimum which may be, for example, one-half inch of mercury.

Needle valve 135 may be adjusted as desired to regulate the admission of air during the periods valve 134 is open.

The reason for maintaining the pressure within evacuation chamber 53 above a predetermined minimum will be clear from subsequent portions of the description. If, for any reason (for example, to test the whole vacuum system for air leakage), it is desired to obtain a pressure lower than the "predetermined minimum," needle valve 135 may, of course, be closed temporarily.

After chamber 53 has been evacuated to the desired low pressure and has been maintained at such low pressure a period of time determined by the particular testing instruction, the testing of the individual holders is started. (The period of testing time is normally measured from the moment at which solenoid switch 134 first operates, i. e., about one minute after starting the pump.) The test voltage is turned on and regulated to the desired value by operation of voltage regulating transformer 44 adjusted by dial knob 46. The value of the applicable voltage may be read by closing switch 171 momentarily and noting the reading on microammeter 167; it will be assumed that transformer 44 is adjusted for a reading of 30 microamperes on meter 167 when switch 171 is closed. For such adjustment of transformer 44 any one of five definite voltages may be obtained depending upon the position of selector switch 45 operated by associated dial knob 47; switch 45 has five positions, labeled 2 to 6 on the dial, and is shown in Figs. 1 and 11 in position No. 3. It will be assumed that with the adjustment of transformer 44 referred to, voltages of 600, 900, 1200, 1500 and 1800 volts respectively are obtained with the five settings of switch 45, since the respective switch settings introduce into the circuit respective resistances of 20, 30, 40, 50 and 60 megohms. These resistance elements are effective to limit the current passed through the holders to a maximum value of 30 microamperes.

The first of the forty-four holders to be tested is now selected by operation of the proper pair of the four pairs of selector switches 144, 145, 146 or 147 controlled by knobs 161, 162, 163 and 164, respectively. (These selector switches are left in the normal "off" position except when actually in use for selecting a holder in the row controlled by a respective switch.) It will be assumed that the first holder to be tested is holder 81 which occupies the first position in the row of eleven holders controlled by "lower" selector switch 144 and "upper" selector switch 203 (Fig. 11) of the same set. Switches 144 and 203 are moved to position "1" therefore by rotation of dial 161 thereby connecting testing circuit conductor 166 to conductor 103 and testing circuit conductor 165 to conductor 104, respectively. It will be apparent from reference to Figs. 4, 7, 9 and 11 that the testing voltage is now applied across terminal pins 106 and 107 of holder 81 which is being tested. Terminal pin 107 of the crystal holder is connected by a suitable conductor provided within the holder to one electrode plate 182, while terminal pin 106 is connected to the other electrode plate 183; the electrode plates in turn are in electrical contact with the respective major surfaces of crystal plate 181.

Figure 12:
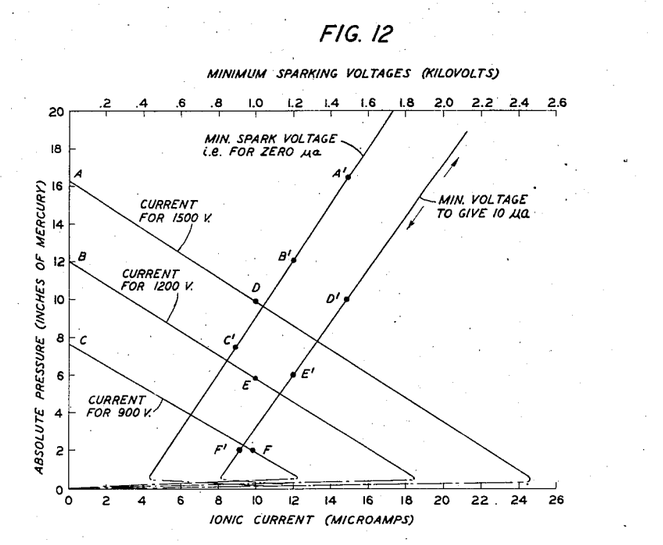
Fig. 12 is a curve illustrating the relationship between pressure and ionic current for a number of different voltage values.

Now, as pointed out above, applicant has discovered that in a case such as this there is a definite relationship, changing as the applied regulated voltage is changed, between the ionic current flow (if any) across the gap between the two electrodes of the crystal plate and the gas pressure within the holder and surrounding the plate. This relationship, for three different test voltages and a specific type of holder and electrode arrangement, is shown by the curves of Fig. 12. For example, assuming a test voltage of 1200 volts, it will be noticed that the ionic current is zero for pressures of twelve inches of mercury and over, and gradually increases as the pressure drops below 12 inches reaching a maximum of approximately 18.5 microamperes at a pressure of approximately one-half inch of mercury.

It will be noticed from the curves of Fig. 12 that once a "critical" pressure in the neighborhood of one-half inch of mercury has been reached, any further decrease in pressure results in an abrupt drop of the ionic current to zero. This is the reason for the provision of the arrangement described above whereby the pressure within the evacuated chamber is held above a predetermined minimum value. In other words, the arrangement of the present invention is designed to operate in a pressure range which is not permitted to fall below approximately one-half inch of mercury, the exact value depending upon the type of holder and its electrode arrangement.

The path followed by the ionic currents, if set up, across the gap formed by the crystal plates, per se, may vary according to the interior arrangement of the holder, the size and shape of the electrodes and other factors. In the instance of the type of holder and crystal plate selected for illustration, applicant has observed that the ionic current usually follows paths leading between the peripheral edges of the two opposed faces of the metal electrode plates 182 and 183 (Fig. 10). It is, of course, desirable that no ionic current flow be set up between the terminals outside of the holder as this would defeat the attempt to determine the conditions within the holder. This desirable result, i. e., prevention of such current flow, is achieved in a manner illustrated in Fig. 7, i. e., by building up the dielectric between and around the terminals so as to leave only very narrow walled spaces between the terminals. This arrangement is disclosed by and claimed in the copending application of J. B. Johnson, Serial No. 528,011 filed March 24, 1944, entitled Method of and apparatus for measuring pressure.

Returning now to consideration of the testing procedure as applied to holder 81, it will be apparent from the above that as the testing voltage which we will assume is regulated at 1200 volts, is applied across terminals 106 and 107 of the holder, the resulting ionic current flow, if any, across the crystal plate within the holder will be an indication of the pressure within the holder; the intensity of ionic current flow will be dicated by microammeter 167, switch 171 being open (Fig. 11).

It will be obvious that if holder 81, which it will be remembered was sealed at atmospheric pressure, is imperfectly sealed and subject to leakage, i. e., if a true hermetic seal was not attained, the pressure within the holder will drop, i. e., air will escape therefrom, during the exhausting of the evacuation chamber and maintenance of the pressure therein at the low point under which the tests are carried out. The amount of leakage from holder 81 to the lower pressure surrounding it will depend, of course, on how imperfectly the holder has been sealed.

As the testing voltage is applied, if no ionic current flow be registered, this will indicate that the pressure within holder 81 is twelve inches of mercury or higher (curve of Fig. 12). However, if ionic current of, for example, 8 microamperes be registered, this will indicate that the pressure within holder 81 has dropped to approximately seven inches of mercury and so on. Interpretation of these results will depend upon the requirements of the particular test, for example, it may be that all holders showing any ionic current flow at all will be rejected or it may be that only those showing ionic current flow greater than a predetermined value will be rejected.

After holder 81 has been tested, the selector switch comprising "lower" switch 144 and "upper" switch 203 will be operated to selectively test the other ten holders in the row. In the same manner the other three sets of selector switches will be operated in turn to test the holders in the other three rows until the entire forty-four holders have been tested. A suitable record will be kept during the tests from which the faulty holders may be identified. The entire testing procedure takes very little time as only a few seconds are required for testing each holder, that is, just sufficient time to observe whether ionic current is passed or, if the requirements of the test are such as to necessitate it, the intensity of such current.

Upon completion of the tests, release valve 143 is opened and pump 111 is stopped. When the vacuum has been entirely relieved, cover 54 is opened and the holders are removed from socket plate 74. Those holders identified as defective are then set to one side for repair and resealing.

Before making the above tests, if it be suspected that any of the holders are subject to conduction shorting, i. e., have a low resistance leakage path between their terminal pins through the base of the holder or because of contamination of the crystal, such holders should be tested for resistance before evacuation by application of the contemplated test voltage. Any that show current readings at atmospheric pressure cannot be tested for leakage. Conduction shorts that might not be detected otherwise, for example, by use of low resistance ohmmeters, will be indicated at the higher voltages used in the present arrangement.

If desired an audible or visual signal (indicated by box 206, Fig. 11) may be incorporated in the circuit; such a signal which may take the form of a bell or lamp for example, facilitates the detection of defective holders as it makes it unnecessary to watch meter 167. The signal unit may comprise, by way of example, a resistor connected as a series element across which the ionic current will produce a voltage drop, an amplifier for amplifying this voltage drop, a sensitive relay operated by the amplifier output and a visual or audible signal in the local circuit of the relay. Suitable adjustment of the signal unit may be made in accordance with the testing requirements; i. e., in accordance with the minimum ionic current which it is desired to indicate or detect.

It will be understood of course that the particular type of holder illustrated in Figs. 9 and 10 has been selected by way of example only and that the invention may be used in testing other types of holders. The absolute pressure-ionic current curves for different types of holders will be generally similar to that of the pressure type holder (Fig. 12) but may differ in values. Data for plotting typical curves for different types of holders may be obtained by making tests of assembled, but unsealed, holders of the respective type involved.

Among the particularly valuable features of the arrangement contemplated by the present invention is the ease with which the conditions under which the holders are tested may be accurately varied in accordance with varying requirements of the testing requirements. For example, the "severity" of the test may, of course, be increased by lengthening the period of time during which the holders are subjected to the lowered pressure within the evacuated chamber before the observational steps of the test are commenced. Also by simple switch adjustment any one of a number of different testing voltages may be selected. Further the holders need not be immersed in liquid during the test; many previous testing arrangements utilized immersion in water or other liquid, often with harmful results.

Figure 14:
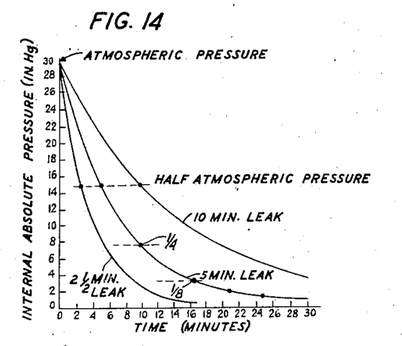
Fig. 14 is a curve illustrating leakage rates for three different magnitudes of leak.

Another particularly valuable feature of the contemplated arrangement resides in the fact that it permits the measurement of magnitude of leaks or leak rates with consequent rejection of holders showing leaks greater than any predetermined allowable leak rate. In this connection magnitude of a leak is intended to mean the time required for the pressure within a holder to drop from one atmosphere to one-half atmosphere when the holder is immersed in a perfect vacuum, the time being counted from the instant of mimersion. (For a stable leak the above might be restated as the time required for the internal pressure to drop to one-half the difference between the external and internal pressures.) For example, if a holder sealed at atmospheric pressure is placed in a vacuum chamber which is evacuated to a negligible pressure in a negligible time, and if the pressure within the holder drops to one-half atmosphere in five minutes the leak is referred to as a five-minute leak. There is illustrated in Fig. 14 curves showing the leakage rates for three different magnitudes of leak, i. e., two and one-half, five and ten minute leaks. As clearly shown by these curves, the pressure within a holder with a five-minute leak falls to one-half atmosphere in five minutes, that of a holder with a two and one-half minute leak in two and one-half minutes and that of a holder with a ten-minute leak in ten minutes. Also that the pressure in the first-mentioned holder falls to one-quarter atmosphere in ten minutes, to one-eighth atmosphere in fifteen minutes and so on. Curves of this nature may be utilized to advantage in conjunction with the absolute pressure-ionic current curves of a particular type of holder for setting the time required for leak testing under specific electrical settings.

While the invention has been described in connection with the testing of hermetically sealed crystal plate holders that have been sealed at atmospheric pressure, it may be used, of course, for testing other types of containers, suitable modifications being made in the socket plate as required. Further, the arrangement may be utilized for testing the seal of containers that have been sealed at pressures other than atmospheric pressure. The arrangement may be used, for example, in testing such sealed devices as electrical condensers and, in short, may be adapted generally to the measurement of degrees of vacuum or pressure within enclosures or in space. The arrangement is intended to function, however, only when the pressure being measured does not fall below approximately one-half inch of mercury. It is realized that in some instances the separated electrodes provided within the container in connection with the normal function of the device may not be adaptable to use in connection with the present method and that in other instances the enclosure may not normally be supplied with separated electrodes of any nature, and it is contemplated that in such instances a set of electrodes be provided within the container for the express purpose of utilization in the method of the present invention.

Figure 15:
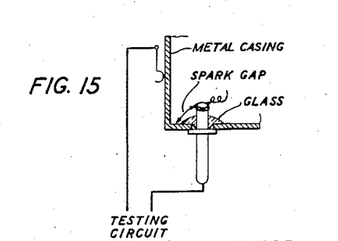
Fig. 15 is a sectional view of a form of auxiliary spark gap.

In instances such as mentioned in the closing sentence of the above paragraph, i. e., where for one reason or another a set of auxiliary electrodes is to be provided for the express purpose of pressure measurement, it is obvious that it will be advantageous to provide electrodes of a type that will tend to produce a stable and controllable spark gap. Among the types of spark gaps contemplated are those formed by opposed ball electrodes, crossed, opposed cylindrical electrodes or opposed rounded plate electrodes; these electrodes may be made of non-sputtering material such as aluminum, or gold may be utilized where long life is particularly desired. Also in the instance of metal enclosures, the auxiliary spark gap may be established between a single sealed-in insulated electrode and the adjacent wall of the container. There is illustrated in Fig. 15, for example, the manner in which a gap may be established between one terminal pin and the adjacent wall of the metal container; the terminal pin may be sealed in the container in the general manner illustrated in Fig. 3b of Patent No. 2,048,556, issued July 21, 1936, to E. D. McArthur.

While the method of pressure measurement described above involves ionization current values for a particular fixed voltage, it is contemplated that other procedures may be followed. For example, it is contemplated that pressure may also be measured by observing the minimum voltage required to give an ionic-current passageway (or spark), reference being had to the "minimum sparking voltage" curve of Fig. 12. Further the minimum voltage required to give a current of $(n)$ μa. might be observed rather than a current that is just detectable; a curve of Fig. 12 shows minimum voltage to give 10 μa. current.

It will be noticed in referring to the curves of Fig. 12 that points A', B' and C' of the minimum sparking voltage-pressure curve correspond respectively to points A, B and C, respectively of the ionic current-pressure curves and that points D', E' and F' of the 10 μa. curve correspond respectively to points D, E and F of the ionic current-pressure curves.

Although the use of direct current has been described in connection with the method contemplated by the invention, it will be understood that alternating current may be used in certain instances if desired.

In the event that the holders to be tested have been sealed at other than atmospheric pressure (it is pointed out above that the method of the invention is readily applicable in such instances) it must be ascertained and taken into account whether or not the holders remained up to the time of test in the same ambient pressure as that under which they were sealed. If it be established that the holders were subjected to a different ambient pressure it must be ascertained for how long a period they were so subjected; this procedure is necessary in view of the possibility that air may leak into, or out of, the holder during such period. The following specific procedures may be followed to advantage in testing holders which have been sealed at pressures other than atmospheric pressure.

First, in the event that the holders have been sealed at a pressure above atmospheric and have then been subjected to atmospheric pressure for a time $(t)$, the sealing pressure and the time $(t)$ must be considered when making the tests, assuming, of course, that time $(t)$ and the difference in pressure are sufficient to indicate the possibility of appreciable leakage of air into, or out of, the holder before the test is started.

Secondly, in the event that the holder has been sealed at pressure $(P_1)$ which is below atmospheric pressure but above one-half inch of mercury, the holder as sealed should give a large ionic current. If the holder is now placed at atmospheric pressure, the internal pressure will rise from $(P_1)$ in the event that leakage occurs. Such holders may be tested therefore by a method which includes subjecting them to atmospheric pressure for a time $(t)$ and then making the ionic current test at atmospheric pressure, (i. e., not in the vacuum chamber) during which test the smaller the ionic current the greater will be the indication of leakage. This is a simple and efficient method of testing holders where they can readily be sealed at pressures of from one-half to one inch of mercury.

Third, in the event the holder has been sealed at a pressure $(P_2)$ which is below "critical" pressure (i. e., below one-half inch of mercury where the ionic current is maximum). Now by employing a test voltage sufficiently high to result in ionic current even at atmospheric pressure and by making two or more tests with the holder at atmospheric pressure (as outlined in the paragraph above) it can be determined whether the internal pressure has changed from the range of pressures in which ionic current increases with increasing pressure (pressures of zero to one-half inch of mercury) to the range of pressures in which ionic current decreases with increasing pressure.

It is also contemplated that a holder may be sealed with one gas confined within the holder which is then exposed to an atmosphere of a different gas. In such a case differential pressure, or diffusion of gases at the same pressure inside of the holder and outside the same are depended upon to change the gas content and hence to change the ionic current flow.

While certain specific embodiments of the invention have been selected for illustration and detailed description, the invention is not, of course, limited in its application to these embodiments. The embodiments described should be taken as illustrative of the invention and not as restrictive thereof.

What is claimed is:

1. Apparatus for selectively testing a plurality of sealed containers for gas leakage, each of which containers is provided with a pair of pin type external terminals electrically connected respectively to opposed electrodes enclosed by the respective container, comprising a first plate for supporting a plurality of containers being tested, a second plate positioned to support said first plate, a gasket between said plates, said first plate having a plurality of apertures therein adated to receive respective pin terminals of containers being tested, said second plate and said gasket each also having a plurality of apertures therein, respective apertures in said first and said second plates and in said gasket being in registry, an electrical contact member positioned in each set of registered apertures, each of said electrical contact members comprising a socket member positioned in a respective aperture of said first plate adapted to engage a respective pin terminal of the containers being tested and a bolt portion positioned in the respectively registered aperture in said second plate and the respectively registered aperture in said gasket, each of said electrical contact members having a shoulder portion, said shoulder portions being in contact with a surface of said gasket and acting in conjunction therewith to produce a gas-tight seal between said first and said second plates, means for lowering the ambient gas pressure at the upper surface of said first plate and within the apertures provided in said first plate to a point substantially below the pressure at which the containers being tested were sealed, a source of voltage, means for selectively applying a voltage from said source across respective pairs of said electrical contact members in any desired order, means for regulating the magnitude of the applied voltage, and means for indicating the magnitude of ionic current flow between the opposed electrodes of a respective container being tested.

2. Apparatus for testing a sealed container, of the type which has been sealed at a certain gas pressure and which encloses a pair of spaced electrodes for gas leakage, comprising an evacuation chamber, means within said chamber for mounting a container being tested, means for exhausting the gas from said chamber, means effective upon attainment of a predetermined minimum gas pressure within said chamber for admitting air to said chamber from the surrounding atmosphere, the rate at which air is admitted by said admitting means being slightly higher than the rate at which gas is removed by said exhausting means whereby the pressure within said chamber is gradually raised from said minimum value; means effective upon the pressure within said chamber reaching a predetermined maximum value substantially below the pressure at which the container was sealed, for rendering said air admitting means ineffective until the predetermined minimum pressure is again attained; a source of voltage, means for applying a voltage from said source across the spaced electrodes enclosed by the container being tested while said container is subjected to a pressure within the range between said maximum and said minimum values, means for regulating the magnitude of the applied voltage, and means operative while the pressure within said chamber is maintained between said maximum and said minimum values for indicating the magnitude of ionic current flow between said electrodes enclosed by the container being tested.

3. Apparatus for selectively testing a plurality of sealed containers for gas leakage, each of which containers is provided with a pair of pin type external terminals electrically connected respectively to opposed electrodes enclosed by the respective container, comprising a first plate for supporting a plurality of containers being tested, a second plate positioned to support said first late, a gasket between said plates, said first plate having a plurality of apertures therein adapted to receive respective pin terminals of containers being tested, said second plate and said gasket each having a plurality of apertures therein, respective apertures in said first and said second plates and said gasket being in registry, a device positioned in each set of registered apertures, each of said devices including, first, electrical conductive means adapted to engage a respective pin terminal of the containers being tested, second, means contacting a surface of said gasket and acting in conjunction therewith to produce a gas-tight seal between said first and said second plates, and, third, means for so attaching the respective device to said second plate that it is supported therefrom in proper position with respect to said first plate entirely independent of support by said first plate, said last-mentioned means being positioned in respective registered apertures of said second plate and said gasket, releasable means for holding said first plate in supported position on said second plate, means for lowering the ambient gas pressure at the upper surface of said first plate and within the apertures provided in said first plate to a point substantially below the pressure at which the containers being tested were sealed, a source of voltage, means for selectively applying a voltage from said source across respective pairs of said electrical contact members in any desired order, means for regulating the magnitude of the applied voltage, and means for indicating the magnitude of ionic current flow between the opposed electrodes of a respective container being tested.

4. The method of determining the effectiveness of the seal of a crystal unit which has been closed and sealed at substantially atmospheric pressure and has two spaced electrically conductive elements extending from the exterior of said unit to a point therewithin which comprises reducing the ambient pressure to a predetermined value lower than the pressure at which said unit was sealed and within the limits of one-half inch to five-eights inch of mercury, applying a voltage across the exterior portions of said conductive elements while maintaining the pressure within the limits specified above, regulating the magnitude of the voltage applied, measuring the magnitude of resulting ionic current flow between the respective portions of said conductive elements within said unit, and indicating ionic current flow of a magnitude exceeding a predetermined value.

5. Apparatus for selectively testing a plurality of sealed containers for gas leakage, each of which containers encloses two separated electrodes and has a pair of external terminals electrically connected respectively to the enclosed electrodes, comprising a first plate for supporting a plurality of containers being tested, a plurality of apertures formed through said first plate and adapted to receive the said external terminals of the containers being tested; a second plate, a plurality of apertures formed through said second plate in registry with the said apertures formed through said first plate; a plurality of electrical contact member socket portions positioned one in each of said apertures formed through said first plate; each of said socket portions being adapted to receive an external terminal of one of said sealed containers when supported by said first plate, and having a bolt portion fixed to each of said socket portions and disposed in one of said apertures formed through said second plate to secure said contact members in proper position with respect to said second plate; means for providing a gas-tight seal between each of the apertures in said first plate and the corresponding aperture of said second plate, a removable cover for said first plate adapted to form a gas-tight enclosure around said first and second plates and the said apertures therein, means for reducing the pressure within said gas-tight enclosure to a point substantially below the pressure at which the containers to be tested were sealed, a source of voltage, means for selectively applying a voltage from said source across said external terminal pairs in any desired order, means for regulating the magnitude of the applied voltage, and means for measuring and indicating the magnitude of ionic current flow between the separated electrodes of a particular container being tested.

6. Apparatus for selectively testing a plurality of sealed containers for gas leakage, each of which containers is provided with a pair of pin-type external terminals electrically connected to opposed electrodes within said containers, comprising a first plate having an upper surface for supporting a plurality of containers being tested, a second plate positioned to support said first plate, a gasket between said plates, said plates having a plurality of apertures in registry therethrough adapted to receive said pin-type terminals of the containers being tested, an electrical contact member positioned in each of said apertures in registry; each of said electrical contact members comprising a socket member positioned in an aperture of said first plate and adapted to engage a pin-type terminal of one of said containers being tested, and a bolt portion positioned in the corresponding apertures in said second plate and in said gasket; each of said electrical contact members having a shoulder portion in contact with the surface of said gasket and acting in conjunction therewith to produce a gas-tight seal between said first and second plates; means for varying the ambient gas pressure at the said upper surface and within said apertures of said first plate to a point substantially below the pressure at which the containers being tested were sealed, a source of voltage, means for selectively applying a voltage from said source across pairs of said electrical contact members in any desired order, means for regulating the magnitude of the applied voltage, and means for indicating the magnitude of ionic current flow between the opposed electrodes of a particular container being tested.

GERALD W. WILLARD.

REFERENCES CITED

The following references are of record in the file of this patent:

UNITED STATES PATENTS

| Number | Name | Date |
|---|---|---|
| 857,388 | Eno | June 18, 1907 |
| 1,377,282 | Schafer | May 10, 1921 |
| 1,697,339 | Baker | Jan. 1, 1929 |
| 1,754,180 | Sabbah | Apr. 8, 1930 |
| 1,808,709 | Blake | June 2, 1931 |
| 1,825,699 | Landrum | Oct. 6, 1931 |
| 2,058,846 | Waterman | Oct. 27, 1936 |
| 2,169,605 | Griese | Aug. 15, 1939 |
| 2,340,837 | Meeker | Feb. 1, 1944 |